US005327776A

United States Patent [19]

Yasui et al.

[11] Patent Number: 5,327,776

[45] Date of Patent: Jul. 12, 1994

[54] LEAKAGE DETECTING DEVICE FOR AN AIRTIGHT VESSEL

[75] Inventors: Katsuaki Yasui; Akira Yamashita, both of Himeji, Japan

[73] Assignee: Mitsubishi Denki Kabushiki Kaisha, Tokyo, Japan

[21] Appl. No.: 67,116

[22] Filed: May 26, 1993

[30] Foreign Application Priority Data

May 29, 1992 [JP] Japan ............................ 4-036330[U]

[51] Int. Cl.[5] ............................................ G01M 3/32

[52] U.S. Cl. .................................... 73/49.2; 73/118.1

[58] Field of Search ..................... 73/49.2, 49.7, 118.1

[56] References Cited

U.S. PATENT DOCUMENTS 5,146,902 9/1992 Cook et al. .................... 73/118.1 X 5,251,477 10/1993 Nakashima et al. ............... 73/118.1

FOREIGN PATENT DOCUMENTS 29225 2/1988 Japan .................................. 73/49.2

9235 1/1991 Japan .................................. 73/49.2

153554 5/1992 Japan .

OTHER PUBLICATIONS

Technical Support Document, Jul. 26, 1991, pp. 12–15, State of California Air Resources Board.

*Primary Examiner*—Hezron E. Williams

*Assistant Examiner*—Joseph W. Roskos

*Attorney, Agent, or Firm*—Sughrue, Mion, Zinn, Macpeak and Seas

[57] ABSTRACT

A leakage detecting device for an evaporated fuel gas system of an automobile draws and maintains a partial vacuum in the air space above the fuel in a tank 1 by temporarily connecting the space to the negatively pressurized intake manifold 5. An oxygen sensor 21 thereafter monitors the oxygen level in the evacuated space for a predetermined period of time, and if the oxygen increase exceeds a predetermined normal increase, a leakage alarm is given.

2 Claims, 2 Drawing Sheets

LEAKAGE DETECTING DEVICE FOR AN AIRTIGHT VESSEL

BACKGROUND OF THE INVENTION

1. Field of the Invention

The present invention relates to a leakage detecting device for an airtight vessel which is employed for inspecting airtightness of, for instance, a fuel tank of an evaporated fuel gas treating device for an automobile or a piping system.

2. Discussion of Background

Conventionally, a leakage detecting device which is employed in an evaporated fuel gas treating device for an automobile, is constructed as shown in FIG. 2.

FIG. 2 is a construction diagram of a conventional leakage detecting device, which is disclosed in "Technical Support Document Jul. 26, 1991" issued by State of California Air Resources Board.

In FIG. 2, reference numeral 1 designates a fuel tank which is mounted on a car body of an automobile, not shown. Numeral 2 designates a canister which is constructed to adsorb evaporated gas from fuel inside the fuel tank 1, and which communicates with the top air space of the fuel tank 1 through a communicating pipe 3.

Numeral 4 designates an air cleaner for cleaning air sucked by an engine, not shown, and 5, an intake pipe connecting the air cleaner 4 to the engine, in which a throttle valve 6 is provided. Further, a portion downstream of the throttle valve 6 in the intake pipe 5, communicates with the canister 2 through a communicating pipe 7. The communicating pipe 7 is provided with a canister purge valve 8 by which the passage is opened and closed.

Numeral 9 is a pipe for communicating the canister 2 to the atmosphere, which is provided with a canister close valve 10. Numeral 11 designates a cap for sealing up the fuel tank 1 and 12, a canister protection valve connected to the fuel tank 1.

Numeral 13 designates a pressure sensor for detecting a pressure in the air chamber portion of the fuel tank 1 in performing a leakage check, mentioned later. This pressure sensor 13 communicates with the air chamber portion of the fuel tank 1 through a pressure communicating pipe 14, the pressure of which is outputted to a control circuit 15.

The control circuit 15 is constructed to control the opening and closing operation of the canister purge valve 8 and the canister close valve 10, and to perform the leakage check on portions from the fuel tank 1 to the canister purge valve 8 and the canister close valve 10 wherein the evaporated fuel gas flows. The leakage check is performed by decompressing the portions wherein the evaporated fuel gas flows, employing a negative pressure inside the intake pipe 5 and by monitoring a pressure change detected by the pressure sensor 13 during a constant time period.

Next, an explanation will be given of the operation of the above device.

Liquid fuel such as gasoline is stored in the fuel tank 1 and air is enclosed on the top side of the liquid surface of the fuel. It is necessary that the air portion communicates with the atmosphere such that the pressure in the fuel tank 1 does not become a negative pressure to an exceeding degree and air in the atmosphere can be introduced therein when the fuel is consumed.

Conversely, when the fuel tank 1 is heated by an atmospheric temperature elevation, sunlight and the like, the air in the fuel tank expands. Therefore, it is necessary to discharge the air in the fuel tank 1 to the outside. However, the air inside the fuel tank 1 contains the evaporated gas of fuel since the fuel normally contains a volatile component. Therefore, when the fuel containing the evaporated gas of fuel is discharged in the air, air contamination is caused. To avoid the air contamination, the air inside the fuel tank is led to flow to the intake pipe 5 through the communicating pipe 3, the canister 2, the communicating pipe 7 and the canister purge valve 8, from which the air is introduced to an engine and the fuel portion is combusted in the engine.

However, when the evaporated gas is introduced into the engine as above, the air-fuel ratio changes, which exerts a very unfavorable influence on the running of the engine especially when the engine is driven in a low output state. A control is performed to prevent the above drawback such that the air containing the evaporated gas does not flow to the engine when the engine is driven in the low output state. The control circuit 15 determines whether the running state of the engine is in the low output state, and closes the canister purge valve 8 when the engine is in the low output state.

At this moment, the control circuit 15 opens the canister close valve 10. In this way, the air containing the evaporated gas is removed of the evaporated gas by the canister 2 and the cleaned air is discharged to the atmosphere through the pipe 9 and the canister close valve 10.

When the canister 2 stores the evaporated gas, the evaporated gas catching function of the canister 2 is gradually saturated. Therefore, the evaporated gas inside the canister 2 flows into the engine, when the engine is in a high output running state and the canister purge valve 8 is opened, thereby purging the canister 2. When the engine is in the high output running state, air in the atmosphere is drawn into the canister 2 through the pipe 9 by employing the negative pressure inside the intake pipe 5. The evaporated gas in the canister 2 flows to the intake pipe 5 through the communicating pipe 7 and the canister purge valve 8 and is introduced to the engine, along with the air containing the evaporated gas from the fuel tank 1. This is the normal operation in the conventional evaporated fuel gas treating device.

However, a large amount of the evaporated fuel gas can be discharged to the atmosphere when the airtightness is lost wherein the cap 11 is not completely closed or some portion of the evaporated fuel gas treating device is destructed. In the conventional case, a leakage check is performed by employing the pressure sensor 13 to avoid such a disadvantage.

This leakage check is performed by decompressing the total evaporated fuel gas treating system by the intake negative pressure of an engine. The control circuit 15 controls the operations of the canister purge valve 8 and the canister close valve 10, and compares a pressure change quantity outputted from the pressure sensor 13 with a second pressure change quantity when the device is normal.

The control circuit 15 closes the canister close valve 10, when the engine is in the high output running state and the canister purge valve 8 is opened, once in a pertinent period of time, and changes the pressure inside the evaporated fuel gas treating device including the fuel tank 1 and the canister 2, into a negative pressure by employing the negative pressure inside the intake pipe 5. Thereafter, the control circuit 15 closes the purge valve 8 thereby generating a closed system in the evaporated fuel gas treating device, and monitors the output signal of the pressure sensor 13 for a certain duration of time.

At this occasion, the control circuit 15 compares a pressure increasing rate when the device is normal, with a second pressure increasing rate detected by the pressure sensor 13. When a rapid pressure increasing rate is recognized in comparison with the one when the device is normal, the control circuit 15 determines that there is a leakage in the system and alarms the operator. The leakage check has been performed as above.

However, the pressure sensor is generally expensive, and, therefore, there is a limitation in reducing the cost in the leakage detecting device employing the pressure sensor as stated above.

SUMMARY OF THE INVENTION

It is an object of the present invention to solve the above problem and to provide a leakage detecting device at a low cost without employing a pressure sensor.

According to an aspect of the present invention, there is provided a leakage detecting device for an airtight unit comprising:

a pressure changing device for changing a first pressure in an airtight unit to a second pressure different from an atmospheric pressure while maintaining said airtight unit in an airtight state;

an oxygen sensor provided at a portion whose pressure is changed by said pressure changing device; and a leakage detecting means for outputting a detecting signal when an oxygen quantity detected by said oxygen sensor changes by more than a predetermined change quantity.

According to this aspect of invention, the pressure sensor can be dispensed with since the leakage is detected by the change of oxygen quantity.

DETAILED DESCRIPTION OF THE PREFERRED EMBODIMENTS

A detailed explanation will be given of an embodiment of this invention in reference to FIG. 1 as follows.

Figure 1:
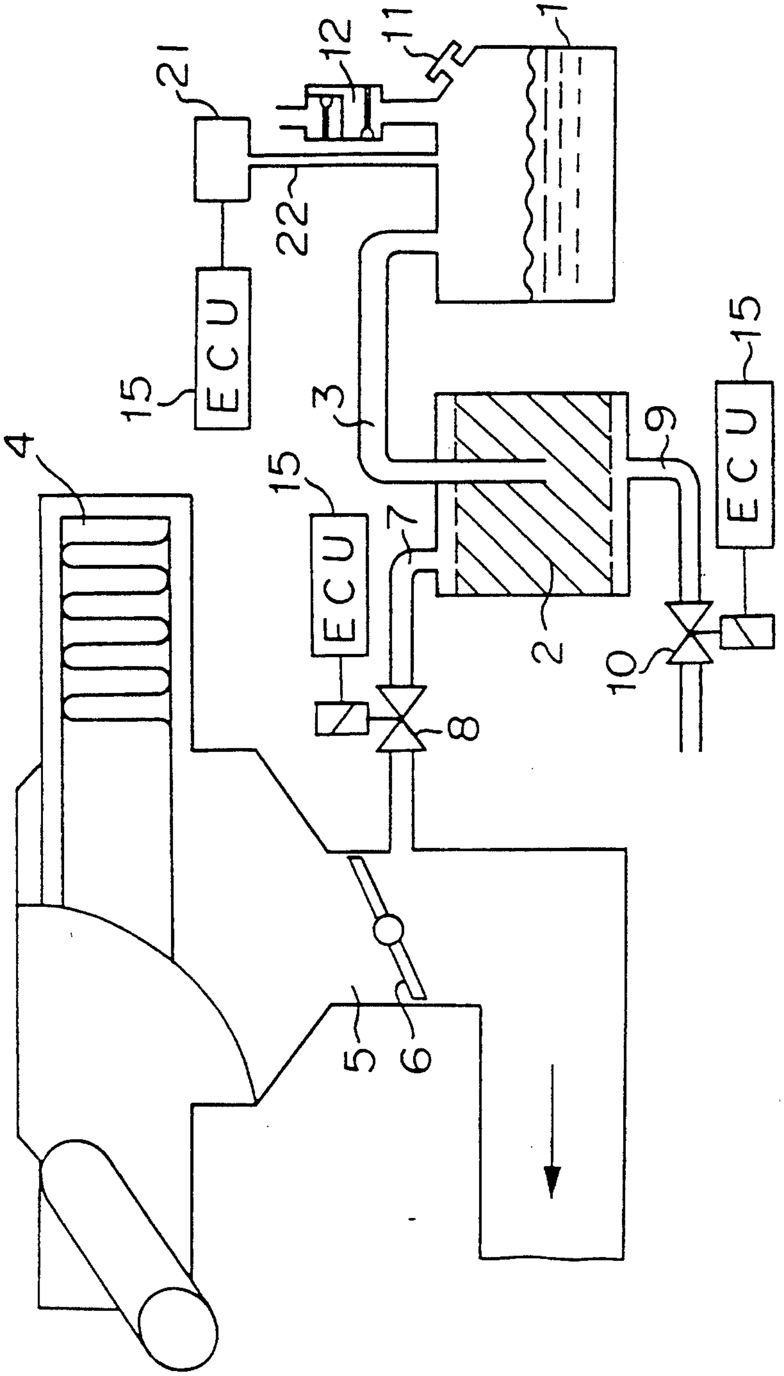
FIG. 1 is a construction diagram of a leakage detecting device according to the present invention.
Figure 2:
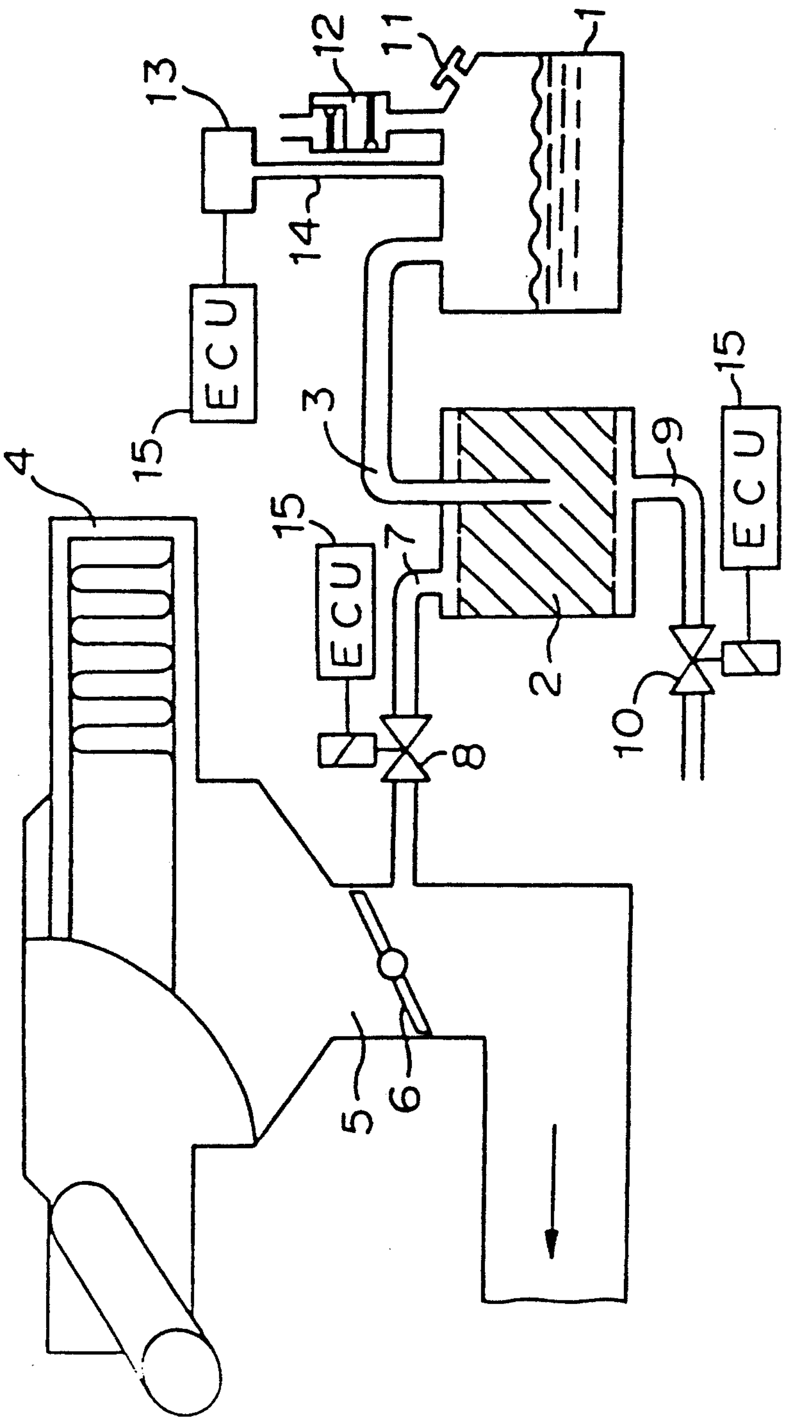
FIGURE 2 PRIOR ART
FIG. 2 is a construction diagram of a conventional leakage detecting device.

FIG. 1 is the construction diagram of a leakage detecting device according to the present invention, wherein the same or the corresponding portions as explained in FIG. 2 are attached with the same notations and their detailed explanation will be omitted.

In FIG. 1, notation 21 designates an oxygen sensor, which communicates with the air space portion of the fuel tank 1 through a pressure communication pipe 22. Further, this oxygen sensor 21 is constructed to output an output signal in accordance with an amount of oxygen molecules present in a constant volume, to the control circuit 15. An explanation will be given of an example employing a galvanic cell type oxygen sensor as the oxygen sensor 21 in this embodiment.

The control circuit 15 employed in this embodiment monitors the oxygen quantity outputted by the oxygen sensor 21, outputs a leakage detecting signal when this detected oxygen quantity increases by more than a predetermined normal increase quantity, and alarms the operator.

Next, an explanation will be given of the operation of the leakage detecting device provided with the oxygen sensor 21.

First, the control circuit 15 makes the inside of the evaporated fuel gas treating device into a closed system of negative pressure as in the conventional example, and monitors the output signal of the oxygen sensor 21 for a certain duration of time. When there is a leak in the evaporated fuel gas treating device, air is sucked into the device through the leak. When the air invades inside the evaporated fuel gas treating device, the amount of oxygen molecules inside the device rapidly increases. The oxygen amount is detected by the oxygen sensor 21 and is sent to the control circuit 15 as an output signal.

The control circuit 15 monitors the output signal from the oxygen sensor 21 during a certain period of time, determines that there is a leakage when the oxygen quantity rapidly increases compared with that when the device is normal, and alarms the operator. Therefore, the leakage check is performed by detecting the fact that the air is sucked into the evaporated fuel gas treating device more rapidly than when the device is normal.

Accordingly, in the leakage detecting device stated as above, the engine, not shown, the canister purge valve 8 and the canister closed valve 10, and the control circuit 15 composes the leakage detecting means which functions as a pressure change device which maintains the evaporated fuel treating device (airtight portion) in a sealed state wherein the pressure thereof is changed to a pressure which is different from an atmospheric pressure. The conventionally employed pressure sensor can be dispensed with, since the leakage is detected by the change of the oxygen quantity in use of the leakage detecting device constructed as above.

Further, the explanation has been given to an example wherein the oxygen sensor 21 communicates with the fuel tank through the pressure communicating pipe 22. However, the portion for connecting the oxygen sensor 21 may communicate with any portion so far as the pressure thereof becomes negative in the evaporated fuel gas treating device, with an effect the same as in this embodiment.

Further, the explanation has been given to an example wherein the leakage check is performed for the evaporated fuel gas treating device of an automobile in this embodiment. However, the object of detecting leakage may be, for instance, an outside storage tank or a pressure tank. The leakage detecting device according to the present invention can determine whether the structures of these tanks comply with a structure standard required by a government ordinance concerning the regulation of dangerous objects.

It is necessary that the pressure tank stands a hydraulic test wherein the test is performed at a pressure 1.5 times as much as a maximum normally used pressure for 10 minutes and the other tank passes a water filling test. In performing the leakage check of these tanks by the leakage detecting device of this invention, an air pressure corresponding with the above hydraulic pressure is applied to the tanks by employing a pressurizing device. The leakage check can be performed by detecting the oxygen quantity by the oxygen sensor 21 with the tanks under a pressurized state and by monitoring the change of the partial pressure of oxygen. The leakage check of the tank which requires a liquid tightness or the airtightness can be performed by decompressing the inside of the tanks as shown in the above embodiment.

A galvanic cell type oxygen sensor has been employed in this example as the oxygen sensor 21. However, and oxygen sensor having other structure may naturally be employed.

Accordingly, this invention can provide a leakage detecting device at a low cost since the leakage detection can be performed by employing the inexpensive oxygen sensor instead of the expensive pressure sensor.

What is claimed is:

1. A leakage detecting device for an evaporated fuel gas system of an internal combustion engine, comprising:

a) fuel tank (1), b) an evaporated fuel gas adsorbing canister (2) in open communication with an air/vapor space above fuel in the tank, c) first control valve means (9, 10) for communicating one end of the canister with the atmosphere, d) second control valve means (7, 8) for communicating another, opposite end of the canister with a negative pressure air intake (5) of the engine, e) an oxygen sensor (21) in open communication with said fuel tank space, and f) an electronic control unit (15) means for:

1) closing the first valve means, 2) temporarily opening the second valve means to draw a partial vacuum in the fuel tank space and the canister, and thereafter closing the second valve means, 3) determining when an increase in the oxygen level in the fuel tank space and the canister over a predetermined time span, as detected by the oxygen sensor, exceeds a predetermined normal value, and in response thereto 4) producing an alarm.

2. A device according to claim 1, wherein the oxygen sensor is a galvanic cell type sensor.

* * * * *